(12) United States Patent
Mon et al.

(10) Patent No.: US 8,469,262 B2
(45) Date of Patent: Jun. 25, 2013

(54) CASH FOLDING APPARATUS AND METHOD

(75) Inventors: Felix A. Mon, Jacksonville, FL (US); William F. Borowski, Millbury, MA (US); Susan Smith Thomas, Gastonia, NC (US); Carl Frederick, II, Newark, DE (US); Jason Michael Ackiss, Matthews, NC (US); Maile George, Concord, CA (US); Robert Fleetwood Armstrong, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 662 days.

(21) Appl. No.: 12/695,867

(22) Filed: Jan. 28, 2010

(65) Prior Publication Data

US 2011/0184864 A1     Jul. 28, 2011

(51) Int. Cl.
    *G06Q 40/00*      (2006.01)
    *G07D 11/00*      (2006.01)
    *G07F 19/00*      (2006.01)

(52) U.S. Cl.
    USPC ............................................................ 235/379

(58) Field of Classification Search
    USPC ........................................ 235/379; 705/39–45
    See application file for complete search history.

(56) References Cited

U.S. PATENT DOCUMENTS

| | | | | |
|---|---|---|---|---|
| 3,767,080 A | * | 10/1973 | Erickson ........................ | 221/13 |
| 5,529,208 A | * | 6/1996 | Carstens et al. .............. | 221/155 |
| 2007/0034683 A1 | * | 2/2007 | Eastman et al. ............. | 235/379 |
| 2007/0228151 A1 | * | 10/2007 | Yokoi et al. ................. | 235/379 |
| 2008/0116259 A1 | * | 5/2008 | Oberan ......................... | 235/380 |
| 2008/0134849 A1 | * | 6/2008 | McGough ........................ | 83/13 |
| 2009/0034802 A1 | * | 2/2009 | Frei et al. ...................... | 382/114 |
| 2009/0242626 A1 | * | 10/2009 | Jones et al. ................... | 235/379 |
| 2010/0116619 A1 | * | 5/2010 | Jones ............................ | 194/217 |

OTHER PUBLICATIONS

Web link: http://www.reghardware.co.uk/2009/05/25/handset_apps_for_blind/print.html, Phone Apps Help Blind 'see'(video), 2 pages.
Web link: http://www.knfbreader.com/products-mobile.php; "knfbReader Mobile", 2 pages.
Web link: http//www.maccast.com/2009/07/01/maccast-2009-07-01-iphone-3gs-accessibility/; 6 pages.
Website: http://www.snaptell.com/; 1 page.
Hackman, Mark, "Hands Off with Google Goggles", Dec. 8, 2009, Web link: http://www.pcmag.com/article2/0,2817,2356786,00.asp; 4 pages.
Web link: http://braillebookstore.com/view.php?T=Pocket+Money+Brailler, Product=Pocket Money Brailler; 2 pages.

(Continued)

*Primary Examiner* — Tuyen K Vo
(74) *Attorney, Agent, or Firm* — Michael A. Springs; Moore & Van Allen, PLLC; Tracea L. Rice

(57) ABSTRACT

Embodiments of the present invention provide currency solutions for the visually impaired by, for example, providing automated teller machines (ATMs) or other cash dispensers configured to dispense folded bills to the customer. The bills are folded based on denomination to allow the customer receiving the bills from the cash dispenser to be able to identify the denomination of each bill. In some embodiments, the cash dispenser is configured to automatically identify whether the customer prefers to receive folded bills and, in some embodiments, the cash dispenser is configured to fold and dispense bills according to customer preferences.

36 Claims, 10 Drawing Sheets

OTHER PUBLICATIONS

Pickens, Hugh, "BrainPort Lets the Blind 'See' With Their Tongues"; Web link: http://hardware.slashdot.org/article.pl?sid=09/08/22/2035256; 3 pages.

Caesar, "New Graphic Displays for the Blind", Dec. 22, 2004; Web link: http://www.physorg.com/news2474.html.

Website: http://maxiaids.com/store/prodIndex.asp?idStore=1 [Products for Independent Living: Blind & Low Vision Store]; 2 pages.

MacDonald, Jay (Bankrate.com), "Changes to Currency May Help the Blind", Oct. 13, 2008 Web link: httn://bankrate.com/finance/checking/changes-to-currency-may-help-the-blind-1.aspx; 2 pages.

MacDonald, Jay (Bankrate.com), "Changes to Currency May Help the Blind", Oct. 13, 2008 Web link: http://bankrate.com/yho/news/pf/20081013_blind_currency_changes_a2.asp; 2 pages.

O'Brien, Maggie and Jordon, Steve (Omaha World-Herald), "No Single Solution to Blind-Friendly Currency", web link: http://www.acb.org/nebraska/legislation/accessible-currency/news-articles/no-single-solution-to-blind-friendly-currency.html; 5 pages.

Web link: www.halfbakery.com/idea/blind_20friendly_20currency; Blind Friendly Currency, 15 pages.

Website: www.acb.org/resources/index.html; American Council of the Blind Helpful Resources for Blind and Visually Impaired Persons, 4 pages.

Web link: www.abledata.com/abledata.cfm?pageid=19327&top=14673&trail=22.13134&discontinued=0, Products: Voice Output Paper Money Identifier, 2 pages.

Vicini, James (Washington, D.C.), "U.S. Court: Currency Discriminates against the Blind", May 20, 2008, Web Link: http://www.reuters.com/article/idUSN2030825720080520, 3 pages.

eHow Contributing Writer, Web link: http://www.ehow.com/how_2043858_help-blind-arrange-currency-their.html, 2 pages.

Web link: http://en.wikipedia.org/wiki/Wired_glove [Wired Glove Information]; 3 pages.

* cited by examiner

CASH FOLDING APPARATUS AND METHOD

FIELD

In general, embodiments of the invention relate to automated teller machines or other cash dispensers, and, more particularly, to systems, methods, and computer program products that provide a currency solution for the visually-impaired by providing an automated teller machine or other cash dispenser that folds or otherwise tactilely alters currency.

BACKGROUND

Often times it can be difficult for the blind or visually impaired (collectively, "visually impaired") to distinguish between different denominations of currency. This is particularly true for paper bills where the different denominations are all the same size and shape. For example, currently in the United States the one-dollar bill, five-dollar bill, ten-dollar bill, twenty-dollar bill, hundred-dollar bill, etc., are all the same size and shape and are only readily distinguishable by sight. In other words, the various bills in the United States currency (and other similar currencies) can be indistinguishable to someone that is blind or otherwise visually impaired. Therefore, systems and methods are needed to help the visually impaired and/or others to be able to identify and distinguish between various denominations of currency, particularly paper bills used as currency.

SUMMARY

Embodiments of the present invention provide currency solutions for the visually impaired by, for example, providing automated teller machines (ATMs) or other cash dispensers configured to dispense folded bills to the customer. The bills are folded based on denomination to allow the customer receiving the bills from the cash dispenser to be able to identify the denomination of each bill. In some embodiments, the cash dispenser is configured to automatically identify whether the customer prefers to receive folded bills and, in some embodiments, the cash dispenser is configured to fold and dispense bills according to customer preferences.

More particularly, embodiments of the present invention provide an ATM having a cash dispensing device configured to dispense bills of a first denomination and a second denomination. The cash dispensing device is configured to dispense bills of the first denomination in a different configuration than bills of the second denomination. In one embodiment, the cash dispensing device is configured to dispense bills of the first denomination in a different configuration than bills of the second denomination by being configured to dispense bills of the first denomination having a fold different from bills dispensed of the second denomination. In this regard, some embodiments of the invention include a bill folding device configured to fold bills of the first denomination different than bills of the second denomination.

In some embodiments of the ATM, the cash dispensing device is configured to dispense bills of the first denomination having a first fold and dispense bills of the second denomination having a second fold different than the first fold. In some embodiments, the cash dispensing device is configured to dispense bills of the first denomination having a first fold and dispense bills of the second denomination having no fold.

In some embodiments of the ATM, the ATM further includes a cash repository configured to store bills of the first denomination in a different configuration than bills of the second denomination.

In some embodiments, the ATM includes a bill denomination determining device configured to determine whether a bill is of the first denomination or the second denomination. In some such embodiments, the ATM further includes a bill folding device configured to fold bills of the first denomination different than bills of the second denomination. For example, in one embodiment, the ATM includes a cash repository configured to store bills of the first denomination and the second denomination in an unfolded configuration, and the bill folding device is configured to fold bills stored in the cash repository. In some embodiments, the bill denomination determining device includes dividers in a cash repository, the dividers configured to separate bills of the first denomination from bills of the second denomination stored in the cash repository. However, in other exemplary embodiments, the bill denomination determining device includes a scanner configured to scan a bill and determine whether the scanned bill is of the first denomination or the second denomination.

In some embodiments of the ATM, the ATM further includes a transaction device reader configured to read a user's transaction device. In some such embodiments, the ATM is configured to dispense bills of the first denomination in a different configuration than bills of the second denomination based on user preferences associated with the user's transaction device.

In some embodiments of the ATM, the ATM further includes a user output device configured to provide user output, the user output comprising an indication of the first denomination when the dispenser is dispensing bills of the first denomination and an indication of the second denomination when the dispenser is dispensing bills of the second denomination. In some such embodiments, the user output device includes a speaker, and the user output includes an auditory signal. In other such embodiments, the user output device includes a personal device interface, and the user output includes a signal readable by a user's personal device delivered through the personal device interface. For example, in one embodiment, the user's personal device includes a mobile phone. In some embodiments of the ATM, the user output device includes a tactile device, and the user output includes a tactile signal.

In some embodiments, the ATM further includes a transaction device reader configured to read a user's transaction device. In some such embodiments, the automated teller machine is configured to fold bills of the first denomination differently than bills of the second denomination based on user folding preferences associated with the user's transaction device. For example, the folding preferences may be stored on the transaction device or, alternatively, the folding preferences may be stored in a remote datastore accessible by the ATM using information received from the transaction device.

Embodiments of the present invention also provide a method involving: (1) receiving paper currency in an apparatus; (2) determining, using the apparatus, a denomination of the paper currency; and (3) automatically folding, using the apparatus, the paper currency based on the denomination of the paper currency. In some embodiments, the method further involves dispensing the paper currency in a folded configuration. In one embodiment of the method, the apparatus includes an ATM.

In some embodiments of the method, the method further involves receiving user preferences at the apparatus, and then folding the paper currency, using the apparatus, based on the denomination of the paper currency and the user preferences. In some such embodiments, receiving user preferences at the apparatus involves the apparatus reading a user's transaction device. For example, in one embodiment of the invention, the transaction device includes a bank card, such as a credit or debit card.

In some embodiments of the method, the method involves the apparatus receiving a request for paper currency from a user, and then the apparatus selecting paper currency based on the request.

Embodiments of the invention further provide an apparatus having: (1) a cash repository device configured to receive cash in the form of one or more bills; and (2) a cash dispensing device configured to provide one or more folded bills where the one or more folded bills are folded based on denomination. In some embodiments, the apparatus includes a bill folding device configured to fold the one or more bills based on denomination. In some embodiments, the apparatus includes a denomination determining device configured to determine the denomination of the one or more bills.

In some embodiments, the apparatus includes a user preference system configured to determine preferences of a user. In some such embodiments, the cash dispensing device is configured to provide one or more folded bills based on the preferences of the user. For example, in some embodiments, the preferences of the user comprise rules regarding how different denominations of bills should be folded. In such an embodiment, the cash dispensing device may be configured to fold the one or more bills in accordance with the rules.

In some embodiments, the apparatus includes an ATM having a user input device configured to receive user input. In some such embodiments, the ATM is configured to dispense one or more folded bills when the user input indicates that a user is visually impaired. In some embodiments, the one or more folded bills include a first denomination of bill folded lengthwise and a second denomination of bill folded widthwise.

Embodiments of the present invention also provide an automated teller machine including: (1) a cash repository having a plurality of bills stored therein; (2) a bill altering device configured to select a bill from the cash repository and alter physical characteristics of the selected bill based at least partially on the selected bill's denomination; and (3) a bill dispensing device configured to dispense the altered bill to a user. For example, in one embodiment of the invention, the bill altering device is configured to alter the physical characteristics of the selected bill based on the selected bill's denomination by folding the selected bill based at least partially on the selected bill's denomination. In another exemplary embodiment of the invention, the bill altering device is configured to alter the physical characteristics of the selected bill based on the selected bill's denomination by impressing dimples or raised bumps into the selected bill based at least partially on the selected bill's denomination. For example, in one embodiment, the dimples or raised bumps make up a Braille or similar communication indicating the denomination of the selected bill. In still other embodiments of the invention, the bill altering device is configured to alter the physical characteristics of the selected bill based on the selected bill's denomination by adhering tactilely identifiable objects, such as stickers with Braille or other tactile indicators, to the selected bill based at least partially on the selected bill's denomination.

The features, functions, and advantages that have been discussed and other features, functions, and advantages may be achieved independently in various embodiments of the present invention or may be combined with yet other embodiments, further details of which can be seen with reference to the following description and drawings.

BRIEF DESCRIPTION OF THE DRAWINGS

Figure 1:
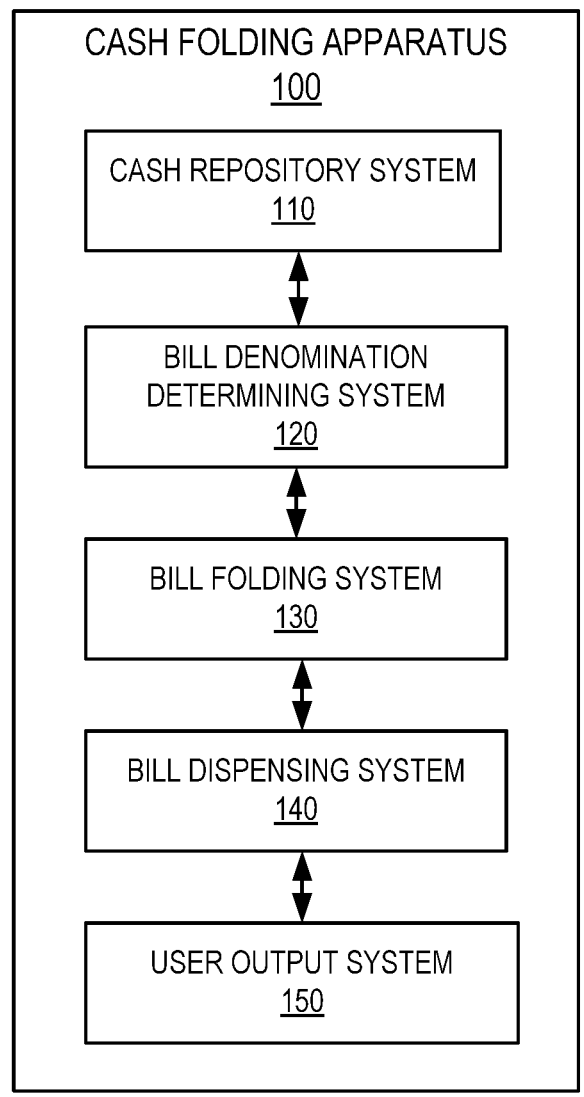
Figure 2:
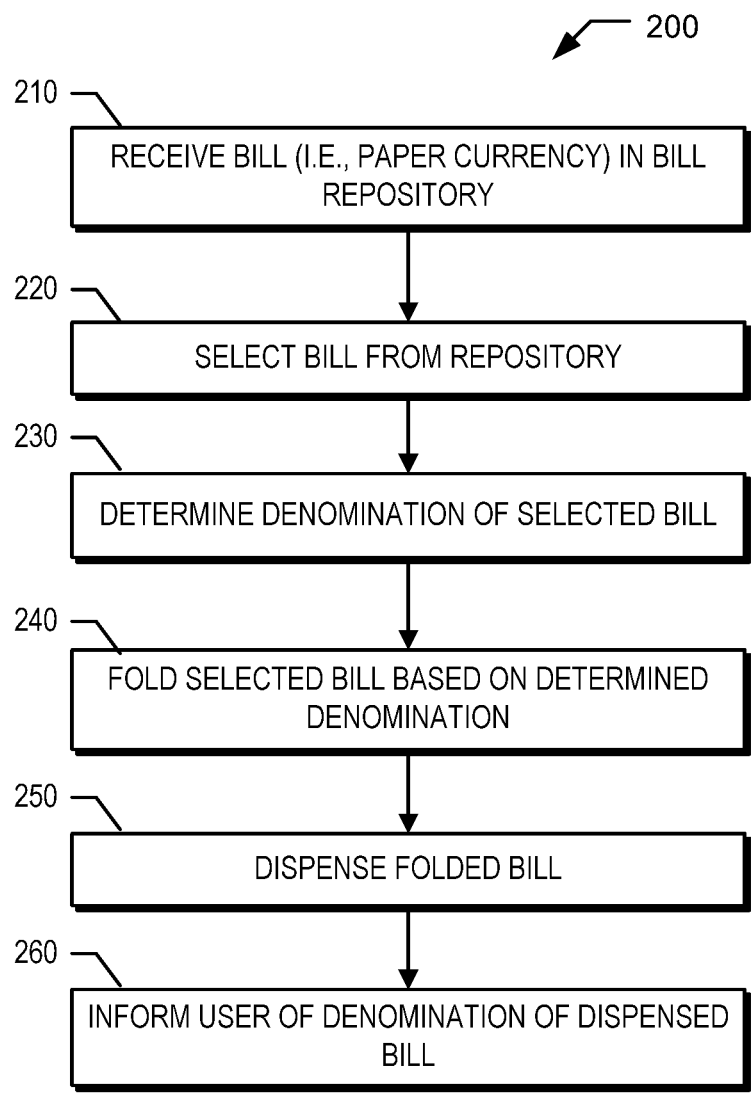
Figure 3:
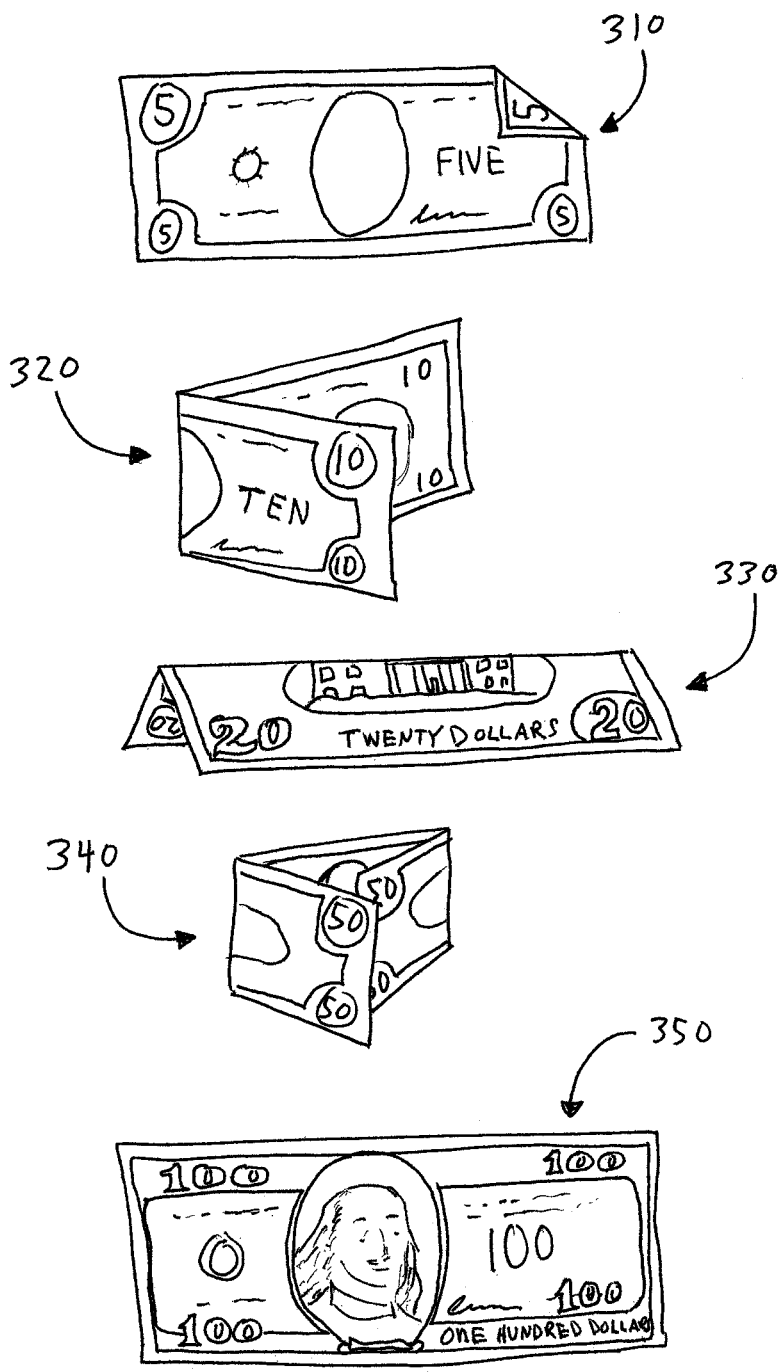
Figure 4:
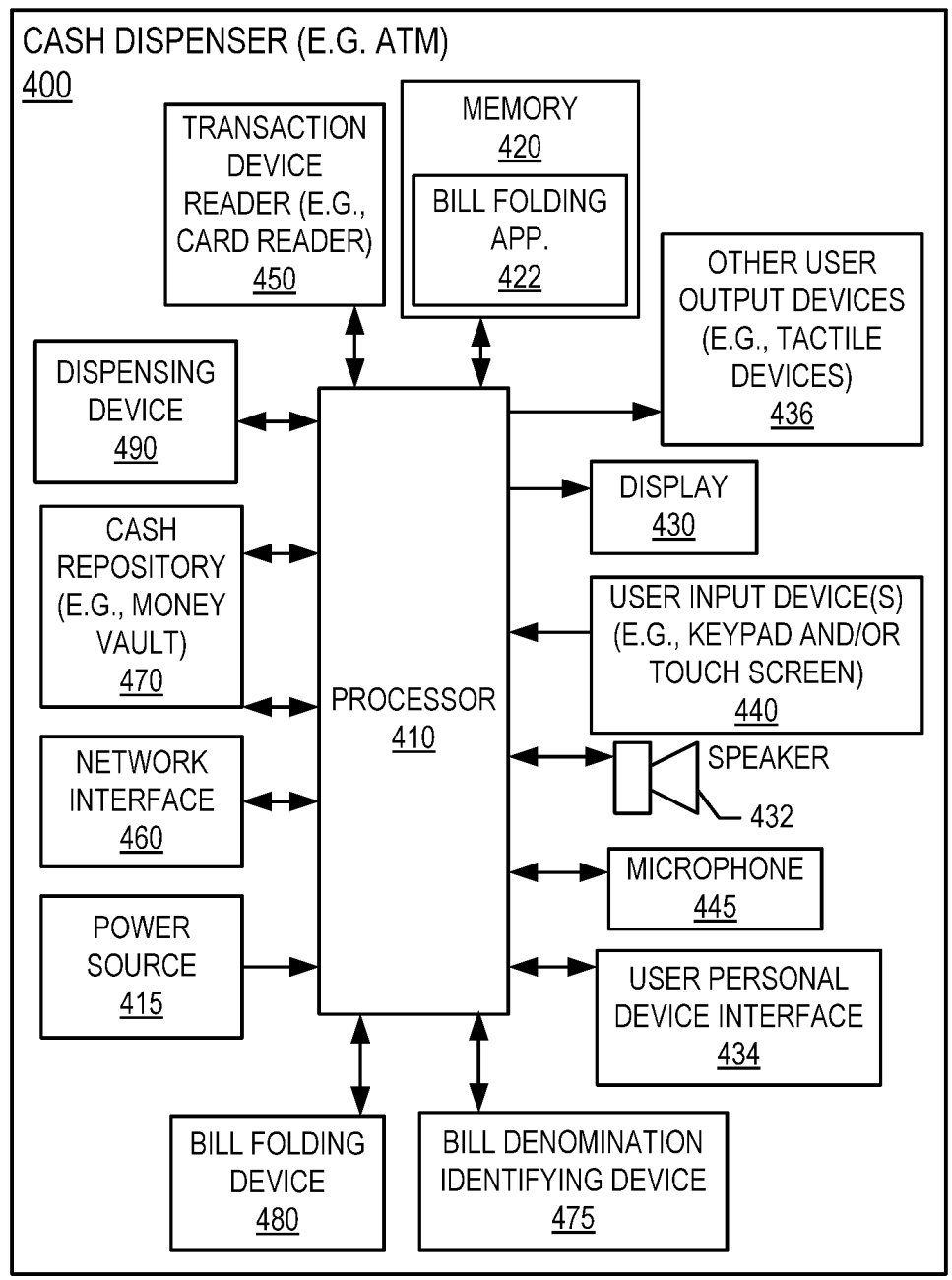
Figure 5:
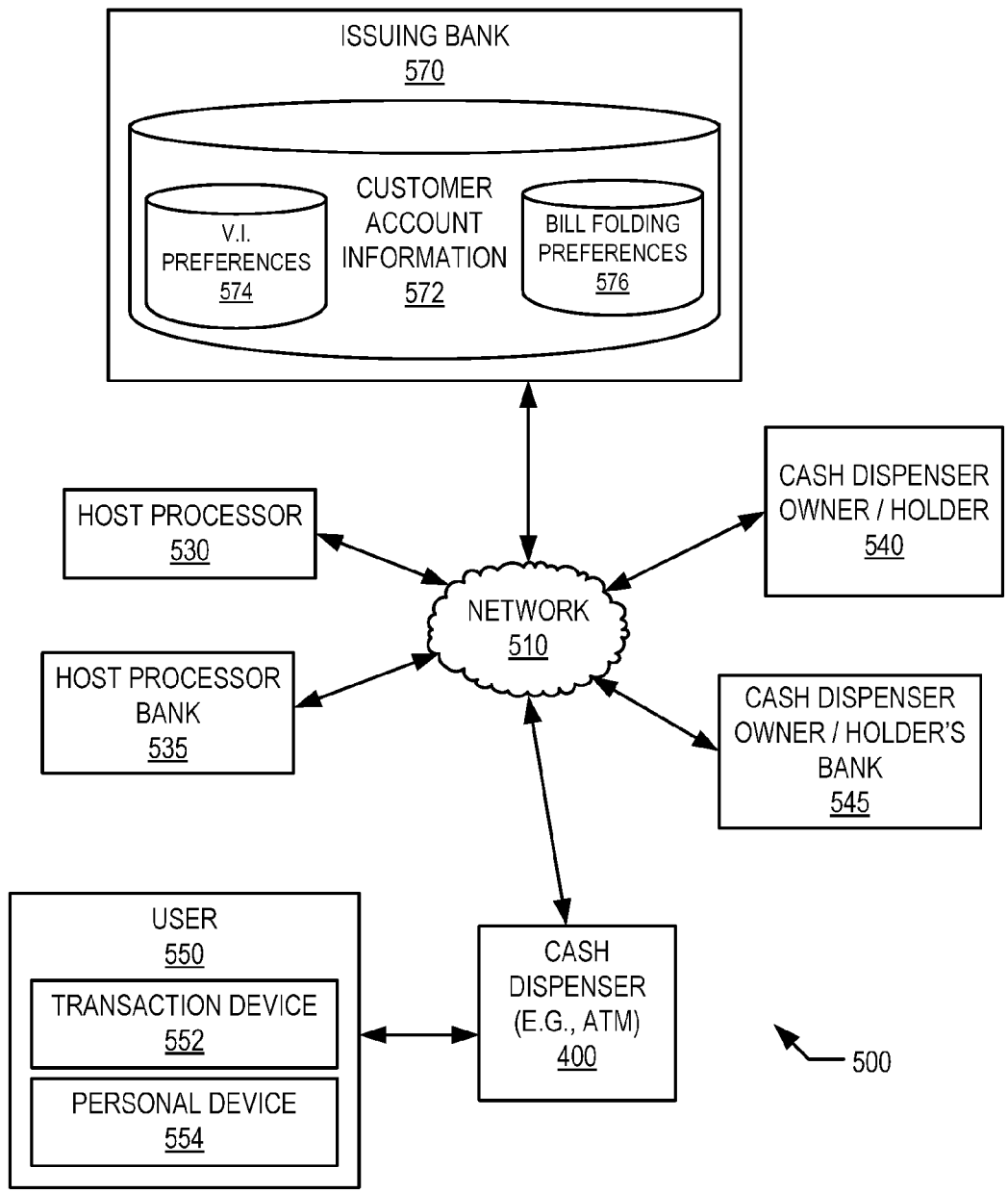
Figure 6:
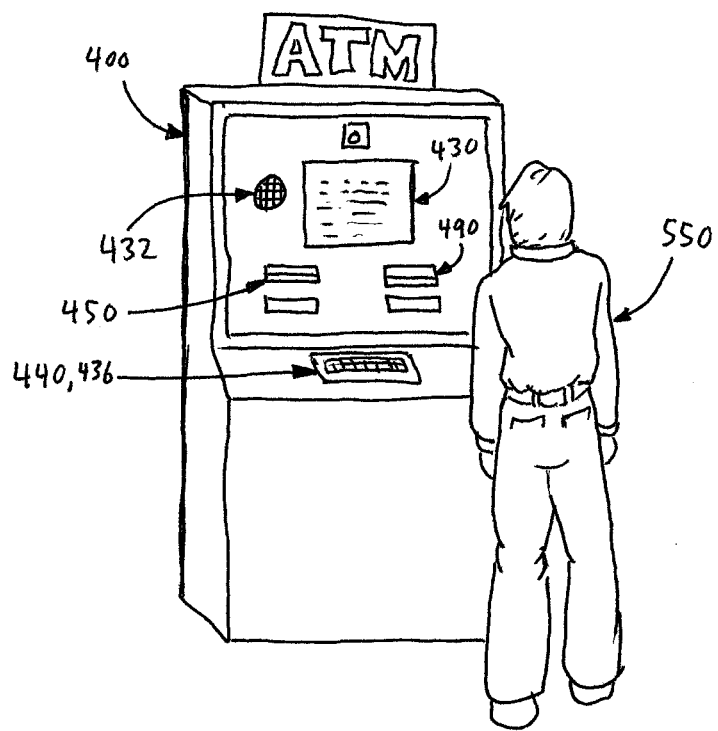
Figure 7:
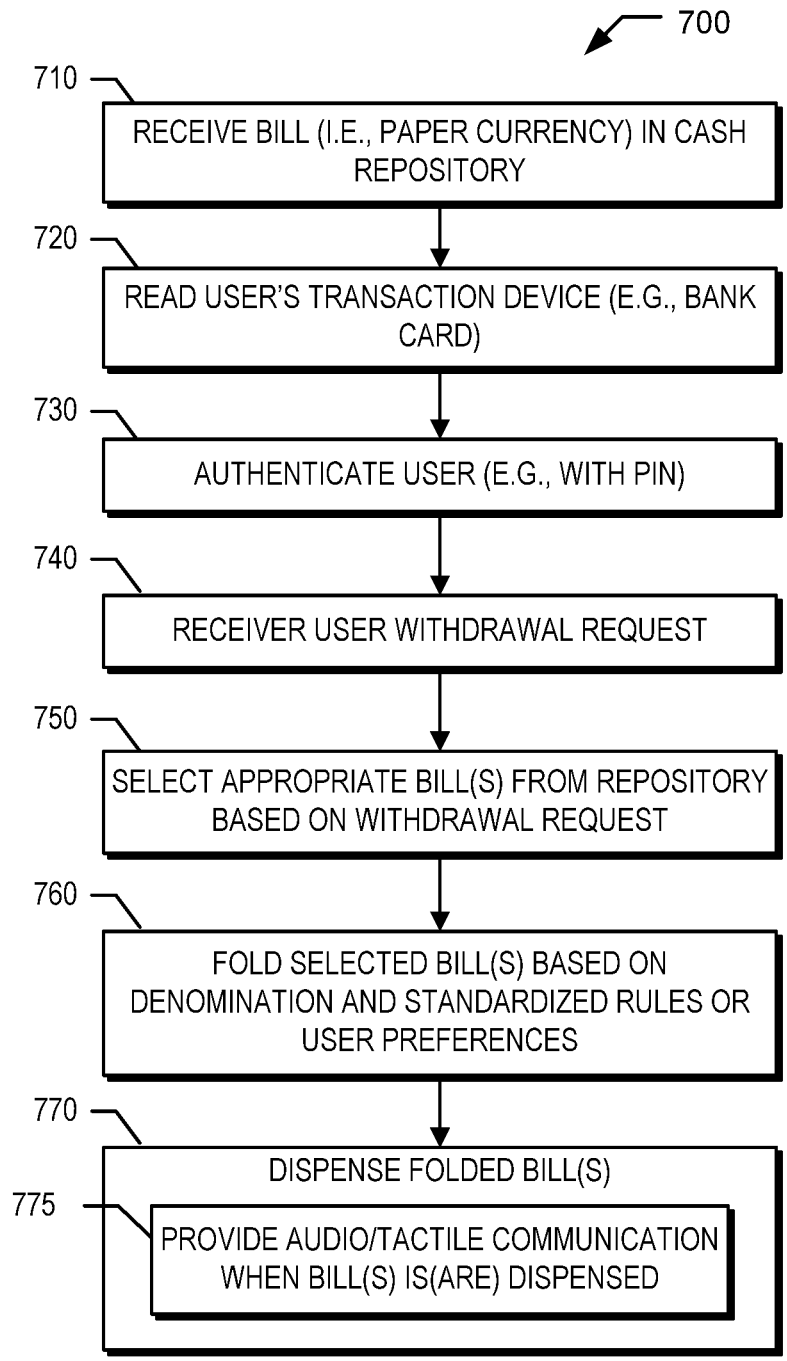
Figure 8:
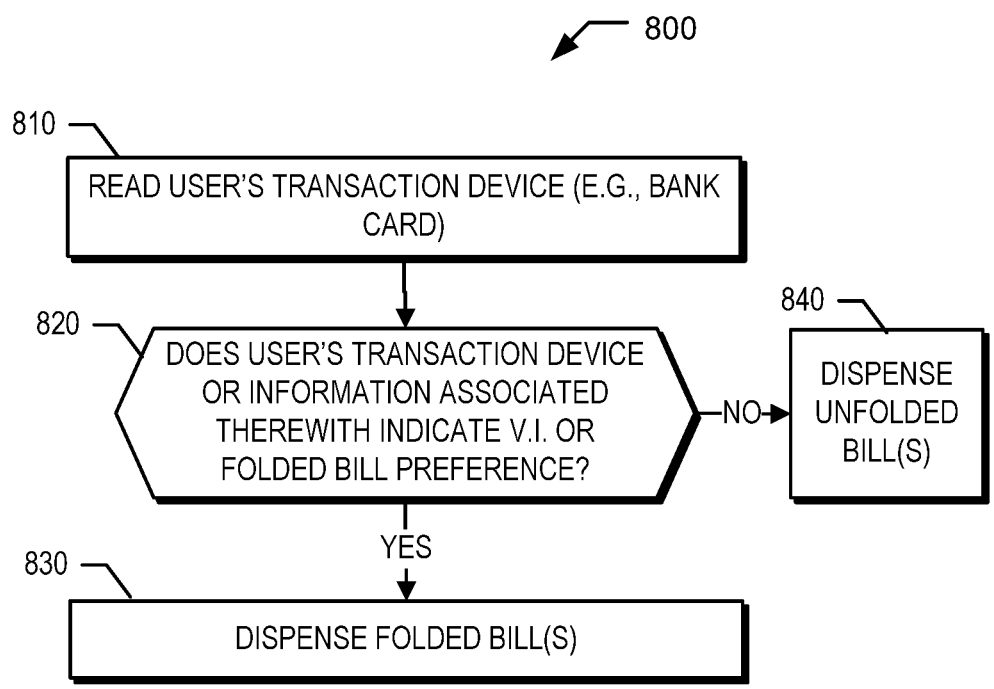
Figure 9:
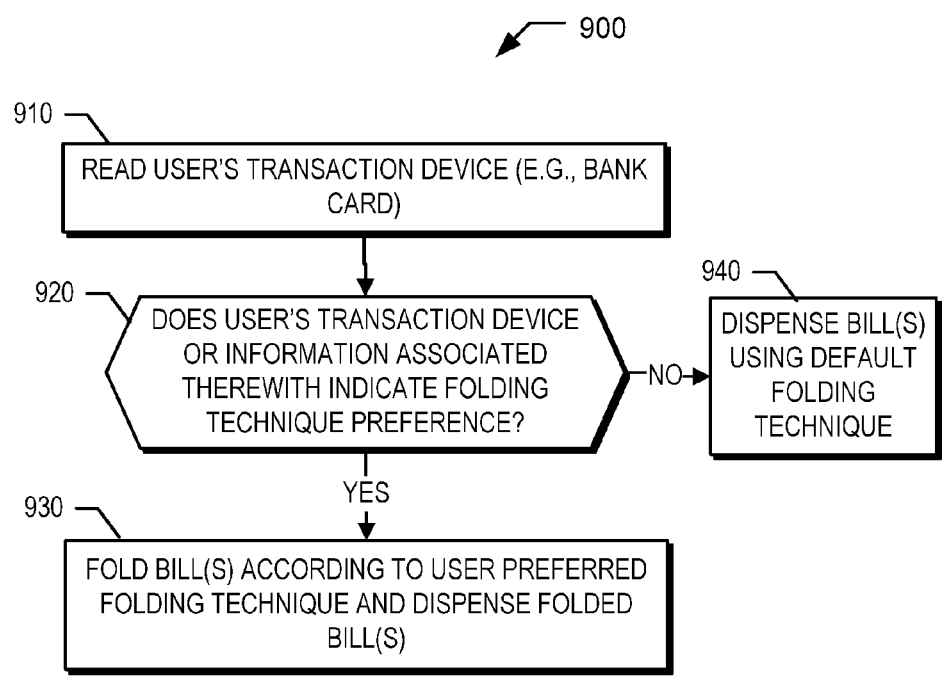
Figure 10:
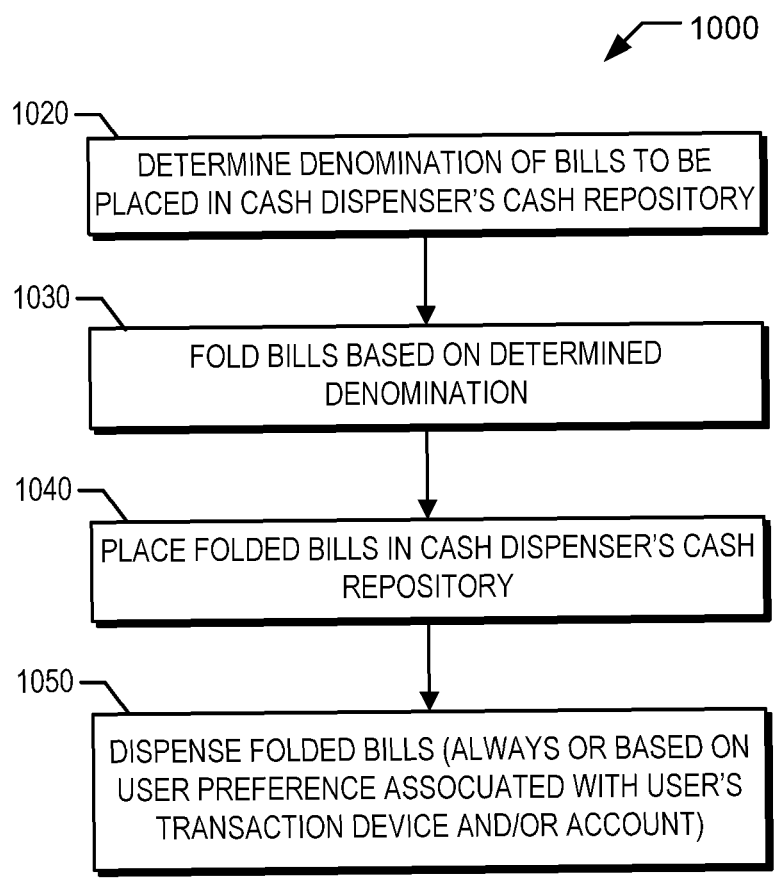

Having thus described embodiments of the invention in general terms, reference will now be made to the accompanying drawings, wherein:

FIG. 1 provides a block diagram illustrating a cash folding apparatus, in accordance with an embodiment of the invention;

FIG. 2 provides a flow diagram illustrating a cash folding and dispensing process performed by the cash folding apparatus of FIG. 1, in accordance with an embodiment of the present invention;

FIG. 3 provides an illustration of folded bills, in accordance with one exemplary embodiment of the invention;

FIG. 4 provides a block diagram illustrating a cash dispenser, in accordance with an embodiment of the invention;

FIG. 5 provides a block diagram illustrating a cash dispensing system and environment, in accordance with an embodiment of the invention;

FIG. 6 provides an illustration of an exemplary cash dispenser and user, in accordance with an embodiment of the invention;

FIG. 7 provides a flow diagram illustrating a cash folding and dispensing process performed by the cash dispenser of FIGS. 4-6, in accordance with an embodiment of the invention;

FIG. 8 provides a flow diagram illustrating a folding process performed by the cash dispenser of FIGS. 4-6, in accordance with an embodiment of the invention;

FIG. 9 provides a flow diagram illustrating a folding process performed by the cash dispenser of FIGS. 4-6, in accordance with an embodiment of the invention; and FIG. 10 provides a flow diagram illustrating a cash folding and dispensing process, in accordance with an embodiment of the invention.

DETAILED DESCRIPTION OF EMBODIMENTS OF THE INVENTION

Embodiments of the present invention now will be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As used herein, a "transaction device" refers to any device that is configured to hold and/or communicate information, such as account identification information, used by a user during a transaction. For example, a transaction device may include a bank card having a magnetic stripe, smart card technology, or other information-storage technology, a near field communication device such as a specially-configured cell phone, a radio-frequency identification tag, and/or the like. As used herein, a "bank card" refers to a credit card, debit card, ATM card, check card, or the like, and a "bank account" refers to a credit account, debit account, deposit account, checking account, investment account, or the like. Although the phrases "bank card" and "bank account" include the term "bank," the card need not be issued by a bank, and the account need not be maintained by a bank and may instead be issued by and/or maintained by other financial institutions. As used herein, unless specifically limited by the context, the term "transaction" may refer to a purchase of goods or services, a withdrawal of funds, an electronic transfer of funds, a payment transaction, a credit transaction, or other transaction involving a financial account.

FIG. 1 provides a block diagram illustrating a cash folding apparatus 100, in accordance with an embodiment of the invention. FIG. 2 provides a flow diagram illustrating a cash folding and dispensing process 200 performed by the cash folding apparatus of FIG. 1, in accordance with an embodiment of the present invention.

As illustrated in FIG. 1, in one embodiment of the invention, the cash folding apparatus 100 has a cash repository system 110, a bill denomination determining system 120, a bill folding system 130, a bill dispensing system 140, and a user output system 150. Although FIG. 1 illustrates each of these systems as separate and distinct systems, it will be appreciated that, in some embodiments, the separation is merely conceptual and two or more of these systems can share one or more devices to perform each system's respective functions. As described in greater detail herein below, in one embodiment of the invention, the cash folding apparatus 100 is or includes an ATM. In other embodiments of the invention, however, the cash folding apparatus is another device, such as a personal desktop device or handheld device used, for example, by the visually impaired to identify and appropriately fold or otherwise tactilely alter any bill based on denomination and, in some cases, user preferences.

As illustrated by block 210 in FIG. 2, in one embodiment of the invention, the cash folding apparatus 100 receives one or more bills in the cash repository system 110. As used herein, the terms "bill" and "cash" refer to any foldable currency, such as paper currency. For example, in one embodiment, the bill is a United States one-dollar bill, five-dollar bill, ten-dollar bill, twenty-dollar bill, fifty-dollar bill, hundred-dollar bill, or the like. In other embodiments, the bill is another flat, rectangular, paper-based currency. In one embodiment, the cash repository system 110 is a safe or vault, such as the vault of an ATM, configured to hold many bills of a single denomination or of different denominations. In such embodiments, some or all of the bills may be placed into the cash repository system 110 periodically by a person having authority to open the cash repository system 110. In some embodiments, some or all of the bills may be placed into the cash repository system 110 by various users depositing cash into the cash folding apparatus 100. In other embodiments, the cash repository system 110 is a tray, slot, cartridge, or other input device that allows a user to insert one bill or, in some cases, a plurality of bills, at a time to have the bill denomination determined and folded for the user by the cash folding apparatus 100.

As illustrated by block 220 in FIG. 2, in one embodiment of the invention, the cash folding apparatus 100 selects a bill from the cash repository system 110. For example, in one embodiment, the cash folding apparatus 100 includes a conveying system comprised, for example, of one or more rollers or conveyers configured to obtain a bill from the cash repository system 110 and move the bill to the bill denomination determining system 120, bill folding system 130, and/or bill dispensing system 140, as the case may be.

As illustrated by block 230 in FIG. 2, the cash folding apparatus 100 determines the denomination of the selected bill using a bill denomination determining system 120. For example, in one embodiment of the invention, the bill denomination determining system 120 includes a scanner, such as a camera, infrared scanner, or other imaging (i.e., optical) device, configured to scan the bill and determine its denomination. Numerous such devices for determining the denomination of a bill exist and can be used. In other embodiments of the invention, the bill denomination determining system 120 involves a denomination separating system in the cash repository system 110 that keeps the bills stored in the cash repository system 110 separated by denomination. For example, in one embodiment, the cash repository system 110 includes different slots or repositories for the different denominations accepted by the cash folding apparatus 100. In one embodiment, when bills are placed into the cash repository system 110 they are placed in the appropriate slot or repository based on the denomination. In such embodiments, the cash folding apparatus 100 determines the denomination of the selected bill by selecting the bill from a particular denomination-specific slot or repository in the cash repository system 110.

As illustrated by block 240 in FIG. 2, the selected bill is folded based on the denomination of the bill. In one embodiment of the invention, the cash folding apparatus 100 includes a bill folding system 130 that automatically folds the selected bill based on the denomination of the bill determined by the bill denomination determining system 120. Any known paper-folding apparatus configured to make folds in paper can be configured to be used in the cash folding apparatus 100. In other embodiments of the invention, however, the bill is folded based on the denomination (e.g., by a bill folding apparatus or by a person) prior to being placed into the cash repository system 110. In other words, in some embodiments of the invention the bills reside in the cash repository system 110 already in a folded configuration.

As illustrated by block 250 in FIG. 2, the folded bill is then dispensed from the cash folding apparatus 100 by a bill dispensing system 140. The bill dispensing system 140 may include a slot, tray, bucket, rollers, conveyors, and/or the like for dispensing bills to, for example, a user.

In some embodiments of the invention, the bills are folded according to user folding preferences communicated to the bill folding system 130. In other embodiments of the invention, the bills are folded in a bank or machine specified manner and the user is expected to learn which folds pertain to which denominations. As such, in some embodiments of the invention, the cash folding apparatus 100 uses a user output system 150, such as a speaker, Braille device, or other tactile or audio device, to inform the user of the denomination of the dispensed bill. In this way, a person, such as a person with a visual impairment, can associate the fold in the dispensed bill with the bill's denomination.

Although the Figures illustrated herein generally illustrate a device, such as an ATM, configured to fold bills based on denomination, in other embodiments of the invention the device is configured to alter the bills being dispensed in ways other than folding but that still permit a user to tactilely distinguish one bill denomination from another. For example, in some such embodiments, the apparatus 100 includes a bill altering system instead of or in addition to the cash folding system 130 where the bill altering system is configured to alter the bill tactilely in ways other than folding. For instance, in one such embodiment, the bill altering system is configured to impress Braille characters (creating impressions on one side of the bill and dimples on the other side of the bill that form the Braille character) or other tactilely identifiable figures into the bills prior to the bills being dispensed to the user, where the tactilely identifiable figures indicate to the user the denomination of the bill or at least help the user distinguish between different denominations. In another such embodiment, the bill altering system may print or otherwise adhere other tactilely identifiable objects to the bill, such as stickers that create a raised pattern, based on the bill's denomination so that a user can more easily distinguish between different denominations of currency.

FIG. 3 illustrates an example 300 of how different bills may be folded so that each type of fold is uniquely associated with a particular denomination of bill, in accordance with one exemplary embodiment of the invention. In the illustrated example embodiment of a bill folding system, five-dollar bills 310 are folded so that one corner of each bill is folded inwards, ten-dollar bills 320 are folded in half widthwise, twenty-dollar bills 330 are folded in half lengthwise, fifty-dollar bills 340 are folded twice widthwise, and hundred dollar bills 350 remain unfolded. It will be appreciated, in view of this disclosure, that countless variations of this folding system or other folding systems exist and can be used in embodiments of the present invention. Unless specifically recited in the claims, embodiments of the present invention are not limited by any particular fold or folding system/technique.

FIG. 4 provides a more detailed illustration of an exemplary embodiment of a cash folding apparatus 100, in accordance with one embodiment of the invention. More particularly, FIG. 4 provides a block diagram illustrating a cash dispenser 400, such as an ATM, in accordance with one embodiment of the present invention. While several embodiments of a cash dispenser 400 are described herein for purposes of example, other types of cash dispensers can readily be configured to employ embodiments of the present invention.

As illustrated in FIG. 4, the cash dispenser 400 includes a processor 410. It is understood that the processor 410 includes circuitry required for implementing audio, visual, and/or logic functions of the cash dispenser 400. For example, the processor 410 may be comprised of a digital signal processor device, a microprocessor device, and various analog-to-digital converters, digital-to-analog converters, and other support circuits. Control and signal processing functions of the cash dispenser 400 are allocated between these devices according to their respective capabilities. The processor 410 may include functionality to operate one or more software programs based on computer-readable instructions thereof, which may be stored in memory 420. In one embodiment of the invention, the memory 420 includes a bill folding application 422 stored therein having computer executable program code for instructing the cash dispenser 400 to perform certain bill folding and/or dispensing procedures described herein.

In general, the memory 420 is communicatively coupled to the processor 410. The memory 420 may include volatile memory, such as volatile Random Access Memory (RAM) including a cache area for the temporary storage of data. The cash dispenser 400 may also include other non-volatile memory, which can be embedded and/or may be removable. The non-volatile memory can additionally or alternatively comprise an EEPROM, flash memory, or the like. The memories can store any of a number of pieces of information and data used by the cash dispenser 400 to implement the functions of the cash dispenser 400. For example, the memories can include an identifier, such as a serial number, capable of uniquely identifying the cash dispenser 400 and/or the type of cash dispenser 400.

The cash dispenser 400 includes a communication interface including, for example, a network interface 460 and a user interface, operatively coupled to the processor 410. The network interface 460 may include a modem, server, or other electronic device that communicatively couples the cash dispenser 400 to another electronic device or a network of devices, such as a LAN, WAN, and/or GAN, such as the Internet or a payment network. The network interface 460 may be configured for wireless or wireline communication. The user interface comprises one or more user output devices, such as a display 430 and a speaker 432 or other audio device (e.g., a ringer, buzzer, or bell). The user interface may also include other user output devices such as tactile devices 436 that may include, for example, a Braille device or a vibrating device. The user interface further includes one or more user input devices 440, such as one or more keys or dials, a touch pad, keypad, touch screen, mouse, microphone 445, and/or the like.

The user interface may also include a user personal device interface 434 configured to communicate with a personal device possessed by the user. For example, in one embodiment the user can use his or her personal headphones to receive audio information from the cash dispenser 400 or use his or her cell phone to receive information from and communicate information to the cash dispenser 400. As such, in some embodiments, the user personal device interface 434 includes a connector, such as a headphone jack or a USB port, for making a wired connection to the user's personal device, and/or a wireless transceiver, such as a Bluetooth enabled transceiver, for making a wireless connection to the user's personal device.

The cash dispenser 400 also includes a transaction device reader 450, such as a bank card reader or other device, for obtaining account identification information from a user's transaction device, such as a bank card. For example, a user's bank card may have a magnetic stripe encoded with account identification information, such as an account number. In such an example, the transaction device reader 450 includes a magnetic stripe reader for reading the account information encoded on the magnetic stripe. In other embodiments, the user's transaction device may include other types of machine-readable code, such as RF (radio frequency) code, barcode, two-dimensional barcode, optical code, infrared code, alpha-numeric code, and/or the like. Likewise, the transaction device reader 450 may include other types of machine-readable code readers, such as an RF reader, a barcode scanner, an optical receiver, an infrared receiver, an imaging device and character recognition software, a near-field communication (NFC) transceiver, and/or the like.

The cash dispenser 400 generally also includes a money safe/vault or other cash repository 470 and cash dispensing device 490 for providing cash to the user during certain transactions. For example, where the cash dispenser 400 is an ATM, the cash repository 470 includes a plurality of cash cassettes for holding large sums of money for the ATM. In another example, where the cash dispenser 400 is a POS terminal, the cash repository 470 may include a cash register configured to hold certain sums of money.

In some embodiments, the cash dispenser 400 includes a bill denomination identifying device 475 configured to identify the denomination of a bill selected from the cash repository 470. Such a device may include one of many a bill scanners or imagers available on the market. Some cash dispensers 400 are configured to receive cash deposits and use the bill denomination identifying device 475 to both determine denominations of deposited bills and determine denomination of bills to be folded. In other embodiments, the bill denomination identifying device 475 is comprised of slots, bins, or other separators in the cash repository 470 that physically keep separate the different denominations of currency stored in the cash repository 470.

In some embodiments, the cash dispenser 400 includes a bill folding device 480 configured to fold bills, such as flat, rectangular paper bills. For example, in one embodiment, the bill folding device 480 is configured to make one or more folds in a bill. As will be apparent in view of this disclosure, the bill folding device 480 may include any paper folding technology available in the paper folding arts.

As further illustrated in FIG. 4, the cash dispenser 400 includes a power source 415 for providing power to the various electronic components of the cash dispenser 400. Other embodiments of the cash dispenser 400 may include other devices and components not illustrated in FIG. 4.

FIG. 5 illustrates a cash dispensing system and environment 500, in accordance with an embodiment of the invention. As illustrated in FIG. 5, the system generally involves a user 550 holding a bank card or other transaction device 552 and, in some cases, a cell phone, headphones, headset, or other personal device 554. As described above, the transaction device 552 may be a credit card, debit card, ATM card, or other type of card that can be used to make a transaction involving an account maintained by an issuing bank 570. Although the invention is generally described herein as involving a bank card, other embodiments of the invention may involve other transaction devices 552 that can be used by a user 550 to make a transaction involving an account associated with the transaction device. For example, in one embodiment, instead of a card, the transaction device comprises a mobile telephone transmitting a radio frequency (RF) signal or other signal encoded with account identification information.

The transaction device 552 is associated with a particular user's account maintained by the issuing bank 570. The issuing bank 570 is the bank or other financial institution that maintains the user's bank account, which, as described above, may be a credit account, debit account, investment account, deposit account, or other account. As such, the issuing bank 570 is also, typically, the financial institution that issues the transaction device 552 or the information stored thereon. In this regard, the issuing bank 570 includes a memory system housing a datastore of user account information 572. The user account information 572 generally includes an account number, an account balance, transaction information about previous transactions, a PIN or other authentication information, and/or other financial and non-financial information about the user and the user's account.

In some embodiments, the customer account information 572 includes an indication as to whether the user is visually impaired (i.e., user "V.I. preferences"). As described in greater detail below, such an indication, where available, can be used by the issuing bank 570 and/or other parties or devices to perform alternative procedures that do not rely on a user's vision or otherwise assist a visually-impaired user. Furthermore, in some embodiments of the invention, the customer account information 572 includes bill folding preferences 576 that include an indication of whether the customer prefers to receive folded bills and/or specifically how the customer's desires his or her bills to be folded. In some embodiments, the user 550 establishes these user preferences when first setting up an account with the issuing bank 570, while in other embodiments, the user 550 can establish these preferences by logging into an online banking website and using a graphical user interface provided by the bank that allows the user 550 to select, unselect, and/or customize these preferences.

The issuing bank 570 generally also includes a network interface for communicating with the network 510, as well as a processor. In some embodiments, the issuing bank 570 includes a bill folding computer-based application stored in the memory system that includes computer-readable instructions for instructing the processor to perform one or more of the functions and procedures described herein in FIGS. 7-10.

The system 500 generally also includes a cash dispenser, such as the cash dispenser 400 illustrated in FIG. 4. As described above, in one embodiment, the cash dispenser 400 is an ATM. In other embodiments, the cash dispenser 400 is a point-of-sale terminal, such as a bank card terminal at the register of a grocery store or a pay-at-the-pump terminal at a gas station. In still other embodiments, the cash dispenser 400 is another device, such as a personal computer or handheld computing device, that is configured to read account identification information from a transaction device 552 and initiate a financial transaction involving the bank account associated with the transaction device 552 or other bill-folding procedure.

The cash dispenser 400 is configured to communicate with the issuing bank 570 via a network 510. In one embodiment, the cash dispenser 400 is owned, held, or otherwise associated with a cash dispenser owner/holder 540. In one embodiment, the cash dispenser owner/holder 540 is the issuing bank 570. For example, many banks have their own ATMs. In such an embodiment, the cash dispenser 400 may communicate directly with the issuing bank 570 over the network 510 or through one or more other entities.

In other embodiments, however, the cash dispenser owner/holder 540 is another bank or financial institution, a merchant, or the like. In such embodiments, the cash dispenser 400 may communicate with the issuing bank 570 through the cash dispenser owner/holder 540, the bank card machine owner/holder's bank 545, and/or one or more other entities.

The cash dispenser owner/holder 540 may have a bank 545 that maintains a bank account for the cash dispenser owner/holder 540. The cash dispenser owner/holder's bank 545 may be the same as or different from the issuing bank 570. For example, where the cash dispenser 400 is a POS terminal at a merchant's store, the cash dispenser owner/holder 540 may be the merchant, and the cash dispenser owner/holder's bank 545 may be the receiving bank that maintains the merchant's account and obtains payment from the issuing bank 570 for purchases or other transactions made at the merchant's store.

In another example, the cash dispenser 400 is a kiosk-style ATM owned or leased by a merchant, such as a gas station or convenience store. In such an embodiment, although the merchant 540 may provide the money in the cash dispenser 400, the cash dispenser 400 may be operated by a host processor 530. In such an embodiment, the cash dispenser 400 may communicate with the issuing bank 570 through the host processor 530. Where the transaction involves a withdrawal of cash from the cash dispenser 400, the issuing bank 570 transfers funds to the host processor's bank 535 via, for example, an electronic funds transfer, and the host processor bank 535 then ACHs the funds to the merchant's bank account maintained by the merchant's bank 545. In this way, the merchant 540 is reimbursed for the funds dispensed at the cash dispenser 400.

Numerous other entities may also be involved in embodiments of the present invention, but are not shown in FIG. 5 for the sake of clarity. For example, the system may involve an automated clearing house (ACH) and/or one or more other financial institutions involved in processing bank card transactions, such as POS purchase transactions and ATM transactions.

Furthermore, although only a single representation of a network 510 is illustrated in FIG. 5, the network 510 may comprise a plurality of separate and discrete networks. For example, the network 510 that is used to communicate information between the issuing bank 570 and the cash dispenser 400 may be the same or different than the network 510 used to communicate information between the issuing bank 570 and another entity illustrated in FIG. 5. The network 510 may include a local area network (LAN), a wide area network (WAN), and/or a global area network (GAN). In this regard, the network 510 may include the Internet, an intranet, an extranet, a telephonic network, and/or a combination of these networks. The network 510 may also include a direct electrical, optical, or wireless connection between one or more of the entities and devices shown in FIG. 5.

FIG. 6 provides an illustration of an exemplary cash dispenser 400 (particularly an ATM example) and user 550, in accordance with an embodiment of the invention. Also illustrated is an example, display 430, speaker 432, user input device 440, tactile user output device 436, transaction device reader 450, and cash dispenser 490. It will be appreciated that FIG. 6 is merely an illustration of one example of a cash dispenser 400 and that other embodiments of the cash dispenser 400 will take other forms and configurations.

FIG. 7 provides a flow diagram illustrating a cash folding and dispensing process 700 performed by, for example, the cash dispenser 400 of FIGS. 4-6, in accordance with an embodiment of the invention. As illustrated by block 710, the cash dispenser 400 receives one or more bills (e.g., paper currency) in the cash repository 470. For example, in one embodiment, a person delivers cartridges of bills to an ATM and inserts them into the ATM's safe or vault, where each different cartridge stores a different denomination of bill.

As represented by block 720, the cash dispenser 400 then reads a user's transaction device 552. For example, in one embodiment, a customer at an ATM swipes his or her bank card through the ATM's bank card reader and the ATM reads a magnetic stripe on the bank card.

As represented by block 730, the cash dispenser 400 then performs a process to authenticate the user 550. Authentication may involve, for example, the cash dispenser 400 using its user interface to ask for a personal identification code, to ask one or more other security questions, to scan a user's fingerprint, face, hand, or iris, perform other biometric identification techniques, and/or the like. In one embodiment, using information read from the user's transaction device 552, the cash dispenser 400 communicates with a remote server of the issuing bank 570 to determine customer account information 572 about an account identified from information read from the user's transaction device 552. The customer account information 572 includes authentication information that the cash dispenser 400 uses to verify the identity or authority of the user 550. For example, in one embodiment, after reading a user's bank card, an ATM asks the user for a personal identification number (PIN). The ATM then sends the information read from the magnetic stripe of a user's bank card and the user-supplied PIN over a financial transaction network to a remote server of the issuing bank that issued the bank card. If the entered PIN matches a PIN associated with the account determined from the bank card, then issuing bank sends a communication to the ATM indicating that the user is authorized to make transactions involving the account associated with the bank card.

As represented by block 740, the cash dispenser 400 receives a request from the user 550 to withdraw cash from the cash dispenser 400. In one embodiment, the cash dispenser 400 uses its user interface to provide the user 550 with a plurality of transaction options including an option to withdraw money from an account associated with the user's transaction device 552. The cash dispenser 400 then receives user input through the user interface 400 indicating the user's selection of the withdrawal option and an amount to be withdrawn. For example, in one embodiment of the invention, after a user is authenticated, an ATM uses its display to ask a user if the user desires to make a withdrawal, a deposit, or a balance inquiry. In some embodiments, the ATM also communicates audio signals that provide the user with these options through a speaker integral with the ATM or part of the user's cell phone, headphones, Bluetooth headset, and/or the like. The ATM then receives the user's selection of the withdrawal option through the user touching a touch screen at the appropriate place, the user touching a button on a keypad (which may have Braille or other tactile markings on or proximate to the button), the user speaking into a microphone integral with the ATM or part of the user's cell phone, headphones, headset, and/or the like. Likewise, the ATM receives user input specifying an amount to be withdrawn.

As represented by block 750, the cash dispenser 400 then selects the appropriate bill(s) from the cash repository 470 based on the user's withdrawal request. In one embodiment, the cash dispenser 400 communicates the requested withdrawal amount to the issuing bank 570 to determine from the issuing bank 570 whether the user 550 is authorized to withdraw the requested amount. If the amount is approved, the cash dispenser 400 then uses the amount, the store of bills in its cash repository 470, rules stored in its memory 420, and/or user preferences associated with the user's transaction device 550 (e.g., read directly from the transaction device 550 or determined from the customer account information 572 associated with an account associated with the transaction device 550) to determine which combination of bill denominations should be dispensed to the user 550. For example, in one embodiment, the user of an ATM requests $75 and the ATM determines that it should provide the user with three twenty dollar bills, one ten dollar bill, and one five dollar bill.

As represented by block 760, the selected bill(s) to be dispensed to the user are folded based on denomination and either bank- or machine-specified rules or user preferences. For example, in one embodiment, the cash dispenser 400, after determining which bills should be dispensed, takes an appropriate bill from the cash repository 470 where the bill is stored in an unfolded configuration. In one embodiment, the cash dispenser 400 selects a desired denomination of bill from a particular cartridge in the cash repository 470 that stores a known denomination of bill. In this way, the cash dispenser 400 knows the denomination of each selected bill. Based on the denomination, the cash dispenser 400 then uses a bill folding device 480 to fold the selected bill prior to dispensing the bill. As illustrated by FIGS. 8 and 9 described herein below, in some embodiments of the invention the decision whether to fold the bill and/or exactly how to fold the bill are based on user preferences. In some embodiments, all of the bills are dispensed in a folded configuration and, in some embodiments, all of the bills are folded according to some standardized or machine-specified folding system regardless of the user.

In other embodiments of the step illustrated by block 760, however, the cash dispenser 400 uses a scanner or other bill denomination determining device 475 to determine the denomination of each bill prior to folding the bill. In still other embodiments, the bills are already properly folded based on denomination and standardized folding rules prior to being deposited into the cash repository 470, as illustrated by FIG. 10 described herein below.

As illustrated by block 770, the cash dispenser 400 then dispenses the folded bill(s) to the user 550 using the cash dispensing device 490. For example, the cash dispenser 490 may use rollers, conveyors, slots, and/or the like to provide the folded bill(s) to the user 550. In some embodiments, each bill is dispensed one bill at a time. In other embodiments, all of the bills of a same denomination are dispensed together at the same time. In still other embodiments, all of the bills are dispensed together at the same time. In some embodiments, the bills are dispensed in order based on denomination, such as from highest denomination to lowest denomination or from lowest denomination to highest denomination.

As represented by block 775, in some embodiments, the cash dispenser 400 provides audio or tactile communication to the user 550 when the bills are dispensed. For example, in one embodiment of the invention, a tone is sounded whenever a bill is dispensed so that a user 550, such as a visually-impaired user, knows when the money is dispensed. In some such embodiments, different tones are sounded based on the denomination of the bill(s) being dispensed. In still other embodiments, the audio signal is not just a tone but actually recites, in words, the denomination of the bill(s) being dispensed. In other embodiments, a Braille or other tactile device indicates to the user 550 when bills are dispensed and/or the denomination of the bills being dispensed. In some embodiments, where the cash dispenser 400 folds bills according to a standardized folding technique rather than a user-specified folding technique, the audio or tactile communication allows a visually-impaired user 550 to learn the standardized folding technique without the assistance of another person the first time the user 550 uses the cash dispenser 400.

In some embodiments, the audio or tactile communication is communicated through the user personal device interface 434 and the user's personal device 554. In some embodiments, the cash dispenser 400 makes the audio or tactile communication for all users 550, while, in other embodiments, the cash dispenser 400 makes the audio or tactile communication only for certain users 550 based on user preferences indicated in information associated with the user's transaction device 552.

For example, in one example embodiment discussed above where an ATM is dispensing $75 as three twenty-dollar bills, one ten-dollar bill, and one five-dollar bill, the ATM folds each the twenty-dollar bill in half lengthwise, folds the ten-dollar bill in half widthwise, and folds a corner of the five-dollar bill inwards. In one example embodiment, the three twenty-dollar bills are dispensed and a tone sounds from the ATM simultaneously. The ten-dollar bill is then dispensed and, again, a tone sounds from the ATM simultaneously. The five-dollar bill is then dispensed and, yet again, a tone sounds from the ATM simultaneously. In some embodiments, a tone sounds after the last bill is dispensed and/or taken by the user 550 to indicate that all bills have been dispensed and/or taken by the user 550 for the current withdrawal transaction.

FIG. 8 provides a flow diagram illustrating a folding process 800 performed by, for example, the cash dispenser 400 of FIGS. 4-6, in accordance with an embodiment of the invention. As represented by block 810, the cash dispenser 400 reads a user's transaction device 552, such as a user's bank card. As represented by decision diamond 820, the cash dispenser 400 determines whether the user's transaction device 552 or information associated therewith (such as information gathered from the issuing bank 570 based on information gathered from the user's transaction device 552) indicates that the user 550 is visually impaired or that user 550 prefers to receive folded bills. As represented by block 830, in the illustrated embodiment, if the cash dispenser 400 does determine that the user 550 is visually impaired or prefers to receive folded bills, then the cash dispenser 400 dispenses folded bills (including, in some embodiments, folding the bills prior to dispensing). However, as represented by block 840, if the cash dispenser 400 does not determine that the user 550 is visually impaired or prefers to receive folded bills, then the cash dispenser 400 defaults to dispensing unfolded bills. In still other embodiments, the cash dispenser 400 uses its user interface to ask the user 550 during each transaction whether the user 550 is visually impaired or would like to receive folded bills, and then the cash dispenser 400 dispenses folded bills and/or performs other procedures, such as folding, tactile communication, and/or audio communication procedures, based on the user's response.

FIG. 9 provides a flow diagram illustrating a folding process 900 performed by, for example, the cash dispenser 400 of FIGS. 4-6, in accordance with an embodiment of the invention. As represented by block 910, the cash dispenser 400 reads a user's transaction device 552, such as a user's bank card. As represented by decision diamond 920, the cash dispenser 400 determines whether the user's transaction device 552 or information associated therewith indicates the user's preferred folding technique. As represented by block 930, in the illustrated embodiment, if the cash dispenser 400 does determine that the user 550 has a preferred folding technique, then the cash dispenser 400 folds bills according to the user-preferred folding technique and then dispenses the folded bills. However, as represented by block 940, if the cash dispenser 400 does not determine the user's preferred folding technique, then the cash dispenser 400 may dispense bill(s) using a default folding technique or not fold bills at all.

FIG. 10 provides a flow diagram illustrating a cash folding and dispensing process 1000, in accordance with one embodiment of the invention where the bills are stored in the cash dispenser's cash repository 470 already in a folded configuration as opposed to embodiments where the cash dispenser 400 folds unfolded bills stored in the cash repository 400. More particularly, as represented by block 1020, a person or machine (including, in one embodiment, the cash dispenser 400) determines the denomination of bills to be placed into the cash repository 470 of a cash dispenser 400. As represented by block 1030, the person or machine (including, in one embodiment, the cash dispenser 400) folds the bills based on denomination, as described for example with reference to FIG. 3. As represented by block 1040, the person or machine (including, in one embodiment, the cash dispenser 400) places the folded bills in the cash dispenser's cash repository 470. As represented by block 1050, the cash dispenser 400 then dispenses the folded bills from the cash repository 470. As described above, in some embodiments the folded bills are dispensed always, while, in other embodiments, unfolded bills are dispensed by default and the folded bills are dispensed based on user preferences associated with the user's transaction device 552 and/or account information 572.

As will be appreciated by one of skill in the art, the present invention may be embodied as a method, apparatus (including a system), computer program product, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system."

Furthermore, embodiments of the present invention may take the form of a computer program product comprising a computer-readable storage medium having computer-usable program code/computer-readable instructions embodied in the medium. Any suitable computer-readable medium may be utilized. The computer-readable medium may be, for example but not limited to, an electronic, magnetic, optical, electromagnetic, infrared, or semiconductor system, apparatus, or device. More specific examples (a non-exhaustive list)

of the computer-readable medium would include the following: an electrical connection having one or more wires; or a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device.

Computer-readable instructions for carrying out operations of the present invention may be written in an object-oriented, scripted or unscripted programming language such as Java, Perl, Smalltalk, C++, or the like. However, the computer-readable instructions for carrying out operations of the invention may also be written in conventional procedural programming languages, such as the "C" programming language or similar programming languages.

Embodiments of the present invention are described above with reference to flowchart illustrations and/or block diagrams of methods, apparatuses (systems) and computer program products, according to embodiments of the invention. It will be understood that blocks of the flowchart illustrations and/or block diagrams shown in FIGS. 1, 2, 4, 5, and 7-10, and combinations of blocks in the flowchart illustrations and/or block diagrams, can be implemented by computer-readable instructions. These computer-readable instructions may be provided to a processor of a general purpose computer, a special purpose computer, or other programmable data processing apparatus to produce a particular machine, such that the instructions, which execute via the processor of the computer or other programmable data processing apparatus, create a particular mechanism for implementing the functions/acts specified in the flowchart and/or block diagram block or blocks.

These computer-readable program instructions may also be stored in a computer-readable memory that can direct a computer or other programmable data processing apparatus to function in a particular manner, such that the instructions stored in the computer-readable memory produce an article of manufacture including instruction mechanisms which implement the function/act specified in the flowchart and/or block diagram block or blocks.

The computer-readable program instructions may also be loaded onto a computer or other programmable data processing apparatus to cause a series of operational steps to be performed on the computer or other programmable apparatus to produce a computer-implemented process, such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. An automated teller machine comprising:
   a cash dispensing device configured to:
   determine the denomination of a plurality of bills, wherein the denomination is either a first or second denomination;
   automatically alter the plurality of bills, based at least partially on determining the denomination of the plurality of bills, wherein bills of the first denomination are altered in a first configuration, wherein bills of the second denomination are altered in a second configuration, and wherein the first configuration is different from the second configuration, wherein the bills are altered such that a user is able to tacitly distinguish the first denomination from the second denomination, and wherein the alteration is temporary and the bill can be unaltered to a pre-altered state;
   dispense the bills of a first denomination in the first configuration; and
   dispense the bills of the second denomination in the second configuration; and
   a communication device configured to communicate with a user's transaction device to receive user preferences, and wherein the cash dispensing device is further configured to alter bills of the first denomination in a different configuration than bills of the second denomination based on the user preferences received via communication with the user's transaction device.

2. The automated teller machine of claim 1, wherein the cash dispensing device is configured to dispense bills of the first denomination in a different configuration than bills of the second denomination by being configured to dispense bills of the first denomination having a fold different from bills dispensed of the second denomination.

3. The automated teller machine of claim 1, further comprising:
   a bill folding device configured to fold bills of the first denomination different than bills of the second denomination.

4. The automated teller machine of claim 1, wherein the cash dispensing device is configured to dispense bills of the first denomination having a first fold, and wherein the cash dispensing device is configured to dispense bills of the second denomination having a second fold different than the first fold.

5. The automated teller machine of claim 1, wherein the cash dispensing device is configured to dispense bills of the first denomination having a first fold, and wherein the cash dispensing device is configured to dispense bills of the second denomination having no fold.

6. The automated teller machine of claim 1, further comprising:
   a cash repository configured to store bills of the first denomination in a different configuration than bills of the second denomination.

7. The automated teller machine of claim 1, further comprising:
   a bill denomination determining device configured to determine whether a bill is of the first denomination or the second denomination; and
   a bill folding device configured to fold bills of the first denomination different than bills of the second denomination.

8. The automated teller machine of claim 7, further comprising:
a cash repository configured to store bills of the first denomination and the second denomination in an unfolded configuration, and wherein the bill folding device is configured to fold bills stored in the cash repository.

9. The automated teller machine of claim 7, wherein the bill denomination determining device comprises dividers in a cash repository, the dividers configured to separate bills of the first denomination from bills of the second denomination stored in the cash repository.

10. The automated teller machine of claim 7, wherein the bill denomination determining device comprises a scanner configured to scan a bill and determine whether the scanned bill is of the first denomination or the second denomination.

11. The automated teller machine of claim 1, further comprising a user output device configured to provide user output comprising an indication of the first denomination when the dispenser is dispensing bills of the first denomination and an indication of the second denomination when the dispenser is dispensing bills of the second denomination.

12. The automated teller machine of claim 11, wherein the user output device comprises a speaker, and wherein the user output comprises an auditory signal.

13. The automated teller machine of claim 11, wherein the user output device comprises a personal device interface, and wherein the user output comprises a signal readable by a user's personal device.

14. The automated teller machine of claim 13, wherein the user's personal device comprises a mobile phone.

15. The automated teller machine of claim 11, wherein the user output device comprises a tactile device, and wherein the user output comprises a tactile signal.

16. A method comprising:
receiving paper currency in an apparatus;
receiving user preferences at the apparatus wherein receiving user preferences at the apparatus comprises the apparatus communication with a user's transaction device;
determining, using the apparatus, a denomination of the paper currency; and
automatically folding, using the apparatus, the paper currency based on the denomination of the paper currency and the user preferences received from communication with user's transaction device, wherein the folding is temporary and the paper currency can be unaltered to a pre-altered state.

17. The method of claim 16, further comprising:
dispensing the paper currency in a folded configuration.

18. The method of claim 16, wherein the apparatus comprises an automated teller machine.

19. The method of claim 16, wherein the transaction device comprises a bank card.

20. The method of claim 16, further comprising:
the apparatus receiving a request for paper currency from a user; and the apparatus selecting paper currency based on the request.

21. An apparatus comprising:
a cash repository device configured to receive cash in the form of one or more bills; and
a cash dispensing device configured to provide one or more folded bills where the one or more folded bills are folded based on denomination, wherein the folding is temporary and the one or more folded bills can be unaltered to a pre-altered state, and
a communication device configured to communicate with a user's transaction device to receive user preferences,
wherein the cash dispensing device is further configured to dispense bills of the first denomination in a different configuration than bills of the second denomination based on user preferences received via communication with the user's transaction device.

22. The apparatus of claim 21, further comprising:
a bill folding device configured to fold the one or more bills based on denomination.

23. The apparatus of claim 21, further comprising:
a denomination determining device configured to determine the denomination of the one or more bills.

24. The apparatus of claim 21, further comprising:
a user preference system configured to determine preferences of a user, wherein the cash dispensing device is configured to provide one or more folded bills based on the preferences of the user.

25. The apparatus of claim 24, wherein the preferences of the user comprise rules regarding how different denominations of bills should be folded, and wherein the cash dispensing device is configured to fold the one or more bills in accordance with the rules.

26. The apparatus of claim 21, wherein the apparatus comprises an automated teller machine, wherein the automated teller machine comprises a user input device configured to receive user input, and wherein the automated teller machine is configured to dispense one or more folded bills when the user input indicates that a user is visually impaired.

27. The apparatus of claim 21, wherein the one or more folded bills comprise a first denomination of bill folded lengthwise and a second denomination of bill folded widthwise.

28. An apparatus comprising:
means for receiving cash in the form of one or more bills;
means communicating with a user's transaction device to receive user preferences; and
means for providing one or more folded bills where the one or more folded bills are folded based on denomination and user preferences received via communication with the user's transaction device, wherein the folding is temporary and the one or more folded bills can be unaltered to a pre-altered state.

29. The apparatus of claim 28, further comprising:
means for folding the one or more bills based on denomination.

30. The apparatus of claim 28, further comprising:
means for determining the denomination of the one or more bills.

31. The apparatus of claim 28, further comprising:
means for determining preferences of a user, wherein the means for providing one or more folded bills comprise means for providing one or more folded bills based on the preferences of the user.

32. An automated teller machine comprising:
a cash repository comprising a plurality of bills stored therein;
a bill altering device configured to select a bill from the cash repository and alter physical characteristics of the selected bill based at least partially on the selected bill's denomination, wherein the alteration is temporary and the bill can be unaltered to a pre-altered state;
a bill dispensing device configured to dispense the altered bill to a user; and
a communication device configured to communicate with a user's transaction device to receive user preferences, and wherein the bill altering device is further configured to alter bills based on user preferences received via communication with the user's transaction device.

33. The automated teller machine of claim 32, wherein the bill altering device is configured to alter the physical characteristics of the selected bill based on the selected bill's denomination by folding the selected bill based at least partially on the selected bill's denomination.

34. The automated teller machine of claim 32, wherein the bill altering device is configured to alter the physical characteristics of the selected bill based on the selected bill's denomination by impressing dimples or raised bumps into the selected bill based at least partially on the selected bill's denomination.

35. The automated teller machine of claim 34, wherein the dimples or raised bumps comprise Braille indicating the denomination of the selected bill.

36. The automated teller machine of claim 32, wherein the bill altering device is configured to alter the physical characteristics of the selected bill based on the selected bill's denomination by adhering tactilely identifiable objects to the selected bill based at least partially on the selected bill's denomination.

\* \* \* \* \*